United States Patent
Huang et al.

(10) Patent No.: US 9,601,963 B2
(45) Date of Patent: Mar. 21, 2017

(54) MOTOR WATERPROOF STRUCTURE

(71) Applicant: ASIA VITAL COMPONENTS CO., LTD., New Taipei (TW)

(72) Inventors: Chun-Hao Huang, New Taipei (TW); Chun-Liang Ho, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 121 days.

(21) Appl. No.: 14/517,931

(22) Filed: Oct. 20, 2014

(65) Prior Publication Data
US 2016/0111934 A1    Apr. 21, 2016

(51) Int. Cl.
| | | |
|---|---|---|
| H02K 5/10 | (2006.01) | |
| H02K 11/00 | (2016.01) | |
| H02K 5/22 | (2006.01) | |
| F04D 19/00 | (2006.01) | |
| F04D 25/06 | (2006.01) | |

(52) U.S. Cl.
CPC ............ H02K 5/10 (2013.01); F04D 19/002 (2013.01); F04D 25/0646 (2013.01); H02K 5/22 (2013.01); H02K 11/0068 (2013.01)

(58) Field of Classification Search
CPC ..... H02K 11/33; H02K 11/0073; H02K 5/132
USPC ........................................ 310/67 R, 68 D, 87
See application file for complete search history.

(56) References Cited

U.S. PATENT DOCUMENTS

| | | | | |
|---|---|---|---|---|
| 4,404,483 A | * | 9/1983 | Lebkuchner | H02K 15/14 310/86 |
| 7,667,359 B2 | * | 2/2010 | Lee | H02K 5/04 310/43 |
| 2005/0116554 A1 | * | 6/2005 | Dano | H02K 11/33 310/58 |
| 2006/0181164 A1 | * | 8/2006 | Ho | H02K 29/03 310/67 R |
| 2007/0145842 A1 | * | 6/2007 | Zhu | F04D 29/582 310/88 |
| 2007/0165376 A1 | * | 7/2007 | Bones | H01L 25/162 361/688 |
| 2012/0319543 A1 | * | 12/2012 | Adachi | H02K 5/10 310/68 R |

* cited by examiner

*Primary Examiner* — Naishadh Desai

(57) ABSTRACT

A motor waterproof structure includes a stator assembly, a casing and a cover body. The casing has a receiving space formed with an open side. A circuit board is disposed in the receiving space. The cover body is disposed on the open side of the receiving space to cover the circuit board. The motor waterproof structure serves to effectively protect the circuit board from being short-circuited and burned out in a humid environment.

8 Claims, 6 Drawing Sheets

MOTOR WATERPROOF STRUCTURE

BACKGROUND OF THE INVENTION

1. Field of the Invention

The present invention relates generally to a motor waterproof structure, and more particularly to a motor waterproof structure, which is able to effectively protect the circuit board from being short-circuited and burned out in a humid environment. Moreover, the motor waterproof structure makes it easy to perform the failure analysis and reworking.

2. Description of the Related Art

Along with the continuous advance of sciences and technologies, there is a trend to develop high-speed and miniaturized electronic apparatuses with integrated functions. As a result, the electronic components are more compactly arranged. The electronic components will generate high heat to cause unstable operation. This will affect the reliability of the electronic apparatus. Therefore, it has become a critical topic how to solve the heat dissipation problem.

The application range of fan motor has become wider and wider. The motor is applied to various specific products such as transportation tools, fans and computer peripheral products. When the motor is used in a humid environment, the stator, windings and circuit board in the motor are quite sensitive to moisture. The moisture may infiltrate into the motor to wet the internal components. This will lead to corrosion of the motor and shorten lifetime of the motor. In some serious cases, the moisture will cause short-circuit and burnout of the internal electronic components of the motor. As a result, the motor will failure. Therefore, a mechanism is required to protect the electronic components of the motor.

There is a conventional means for solving the above problem. That is, the gap between the rotor and the stator of the fan and the gap between the stator and the fan frame are as minified as possible. In this case, the internal components of the motor are not so likely to be moisturized. However, such means can only provide limited protection effect.

There is another means to protect the internal components. That is, a cement material is filled into the motor to coat the motor with a layer of cement. This can avoid infiltration of moisture. However, this also leads to a shortcoming that the motor is completely enclosed in the cement body. When performing failure analysis for the motor, it is necessary to entirely disassemble the motor. During the disassembling process, the original aspect of the motor is apt to be destroyed due to enclosure of the cement body. Therefore, this means leads to difficulty in failure analysis and reworking.

According to the above, the conventional motor waterproof structure has the following shortcomings:
1. The circuit board can be hardly effectively protected.
2. The circuit board is likely to be short-circuited and burned out in a humid environment.
3. It is hard to perform failure analysis and reworking.

SUMMARY OF THE INVENTION

It is therefore a primary object of the present invention to provide a motor waterproof structure, which is able to effectively protect the circuit board from being short-circuited and burned out in a humid environment.

It is a further object of the present invention to provide the above motor waterproof structure, which can minimize the destruction of the original aspect of the motor when performing failure analysis.

To achieve the above and other objects, the motor waterproof structure of the present invention includes a stator assembly, a casing and a cover body. The stator assembly has multiple silicon steel sheets and multiple windings. The casing has a receiving space formed with an open side. A circuit board is disposed in the receiving space and electrically connected with the windings. The cover body is disposed on the open side of the receiving space to cover the circuit board.

The circuit board is completely sealedly enclosed in the casing and the cover body. Under such circumstance, the circuit board is protected from infiltration of moisture so that the circuit board and the internal electronic components are protected from being short-circuited and burned out in a humid environment. In addition, when it is desired to perform failure analysis for the motor, it is only necessary to detach the cover body from the casing to perform the analysis without destroying the circuit board and the motor. This solves the problem of the conventional motor that the motor is totally sealedly enclosed by the cement body and it is hard to disassemble the motor and the circuit board is likely to be damaged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
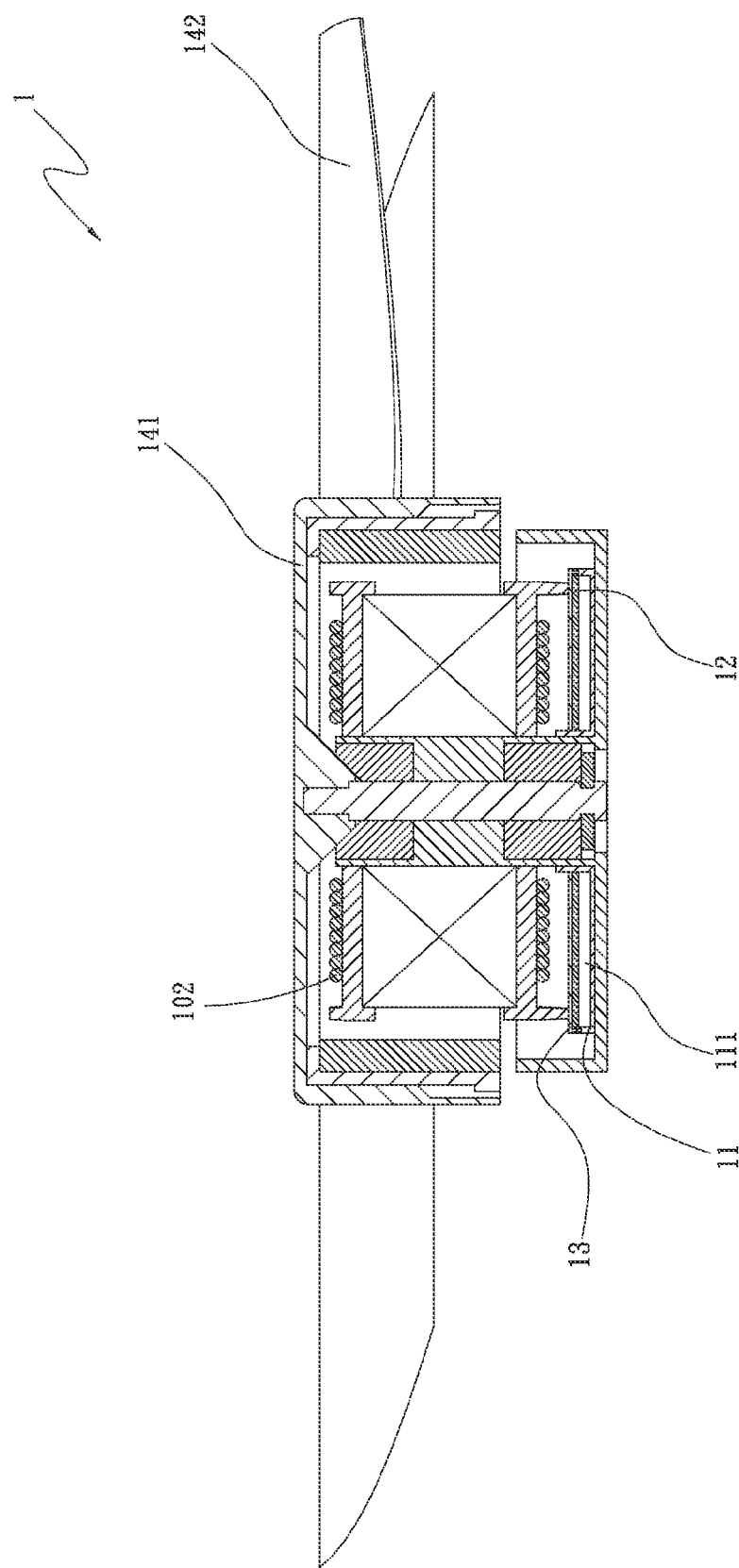
FIG. 1A is a sectional view of a first embodiment of the motor waterproof structure of the present invention.
Figure 1B:
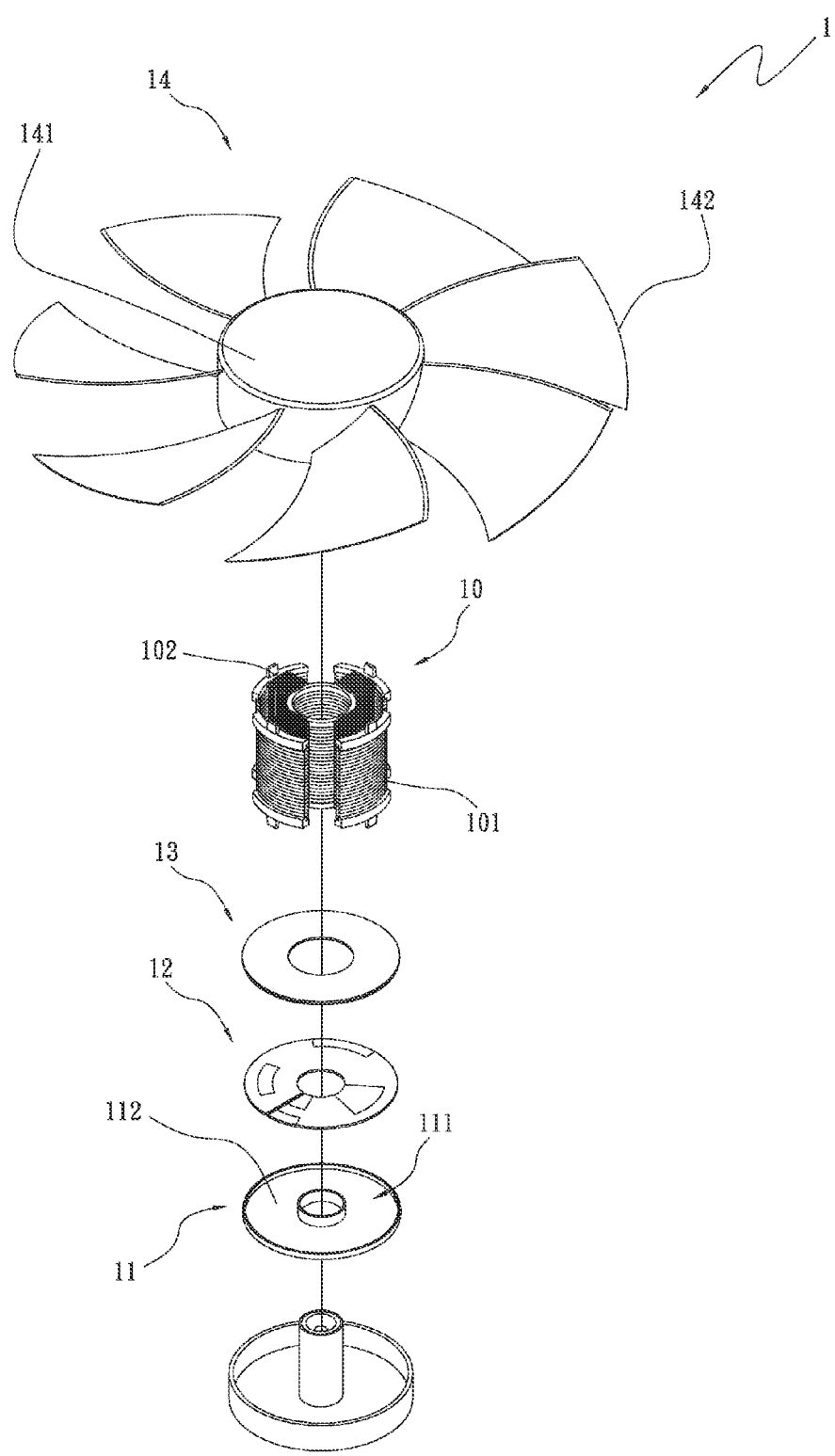
FIG. 1B is a perspective exploded view of the first embodiment of the motor waterproof structure of the present invention.

Please refer to FIGS. 1A and 1B. FIG. 1A is a sectional view of a first embodiment of the motor waterproof structure of the present invention. FIG. 1B is a perspective exploded view of the first embodiment of the motor waterproof structure of the present invention. According to the first embodiment, the motor waterproof structure 1 of the present invention includes a stator assembly 10, a casing 11 and a cover body 13. The stator assembly 10 has multiple silicon steel sheets 101 and multiple windings 102. The casing 11 has a receiving space 111 formed with an open side 112. A circuit board 12 is disposed in the receiving space 111 and electrically connected with the windings 102. The casing 11 is made of polymer material or metal material. The cover body 13 is disposed on the open side of the receiving space 111 to cover the circuit board 12.

The motor waterproof structure 1 further has a fan impeller 14 having a hub 141 and multiple blades 142 annularly arranged around the hub 141.

Please further refer to FIG. 1B. The cover body 13 has the form of a sealing cover. After the circuit board 12 is placed into the receiving space 111, the cover body 13 is connected with the casing 11 by means of engagement to block the open side 112, whereby the circuit board 12 is completely covered by the cover body 13 and sealedly enclosed in the cover body 13 and the casing 11. Under such circumstance, the circuit board 12 is protected from infiltration of moisture in a humid environment. In this case, the circuit board 12 is prevented from being short-circuited and burned out. In addition, when it is desired to perform failure analysis for the motor, it is only necessary to detach the cover body 13 from the casing 11 to perform the analysis. This solves the problem of the conventional motor that the motor is totally enclosed by the cement body and it is hard to disassemble the motor. Moreover, when detached, the original aspect of the circuit board 12 will not be destroyed.

Figure 2:
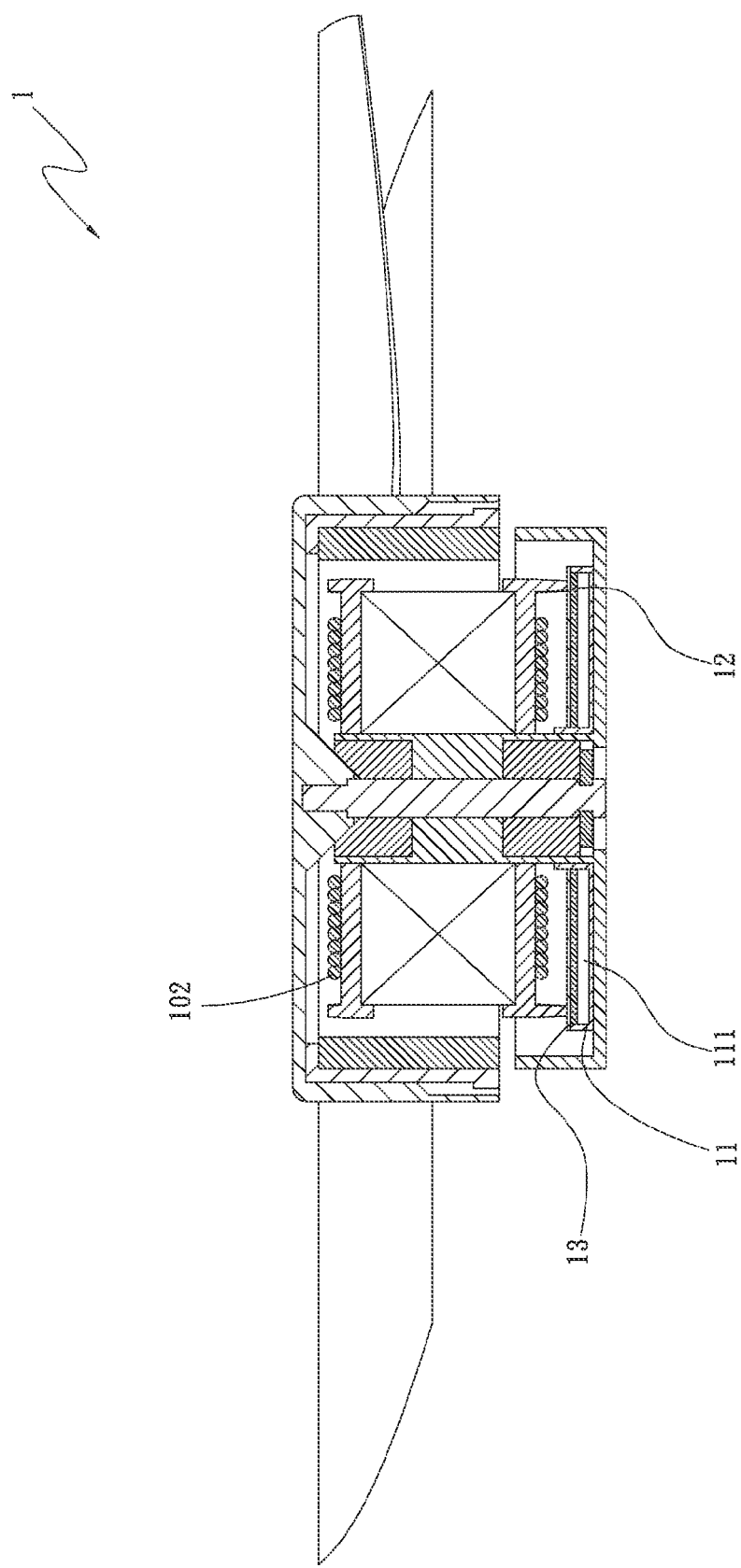
FIG. 2 is a sectional view of a second embodiment of the motor waterproof structure of the present invention.

Please now refer to FIG. 2, which is a sectional view of a second embodiment of the motor waterproof structure of the present invention. The second embodiment is partially identical to the first embodiment in component and connection relationship between the components and thus will not be repeatedly described hereinafter. The second embodiment is mainly different from the first embodiment in that the cover body 13 of the second embodiment has the form of insulation cement body. After the circuit board 12 is placed into the receiving space 111, the insulation cement body is filled to upper side of the circuit board 12, whereby the cover body 13 of the insulation cement body is connected with the casing 11 by means of bonding so that the circuit board 12 is completely enclosed in the insulation cement body and sealedly enclosed in the cover body 13 and the casing 11. Under such circumstance, the circuit board 12 is protected from infiltration of moisture in a humid environment. In this case, the circuit board 12 is prevented from being short-circuited and burned out. In addition, when it is desired to perform failure analysis for the motor, it is only necessary to detach the cover body 13 from the casing 11 to perform the analysis. This solves the problem of the conventional motor that the motor is totally sealedly enclosed by the cement body and it is hard to disassemble the motor.

Figure 3A:
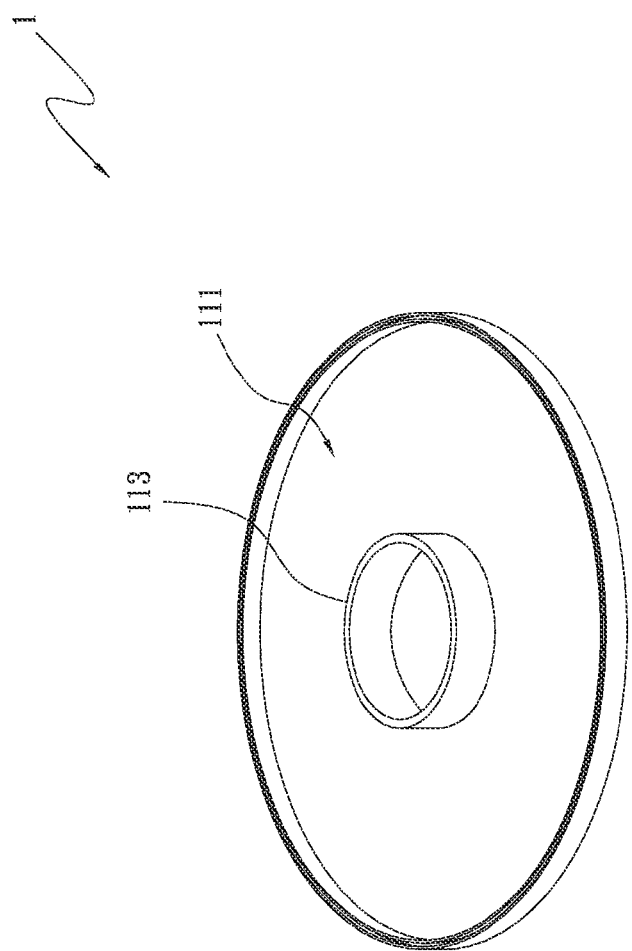
FIG. 3A is a perspective view of a third embodiment of the motor waterproof structure of the present invention.
Figure 3B:
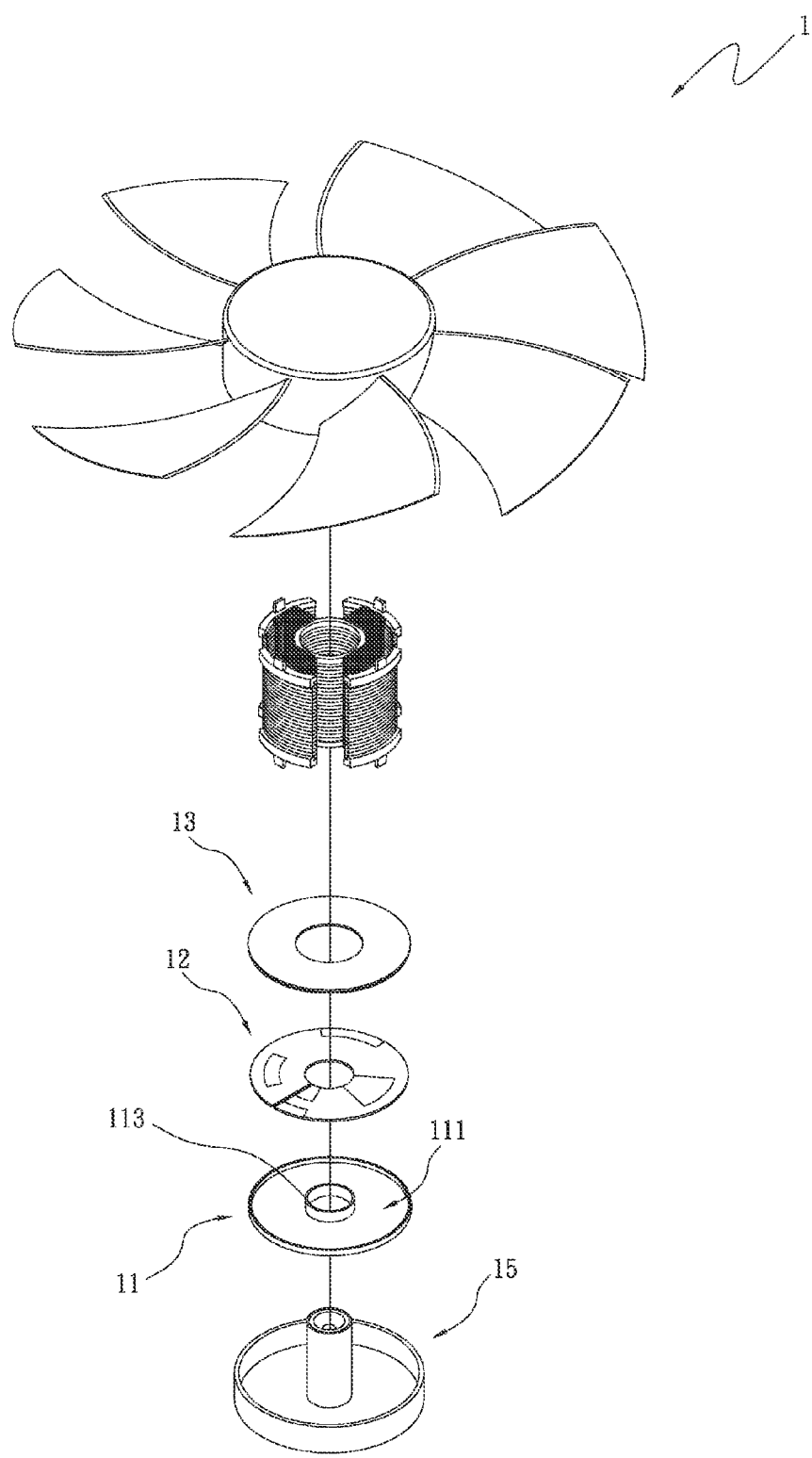
FIG. 3B is a perspective exploded view of the third embodiment of the motor waterproof structure of the present invention.

Please now refer to FIGS. 3A and 3B. FIG. 3A is a perspective view of a third embodiment of the motor waterproof structure of the present invention. FIG. 3B is a perspective exploded view of the third embodiment of the motor waterproof structure of the present invention. The third embodiment is mainly different from the first embodiment in that the casing 11 is formed with an assembling section 113 in the receiving space 111. The circuit board 12 is fitted on the assembling section 113. The assembling section 113 of the casing 11 is latched on a bearing cup 15. Then the cover body 13 covers the circuit board 12, whereby the circuit board 12 is completely enclosed in the cover body 13 and the casing 11. In this case, the circuit board 12 and the electronic components are protected.

Figure 4:
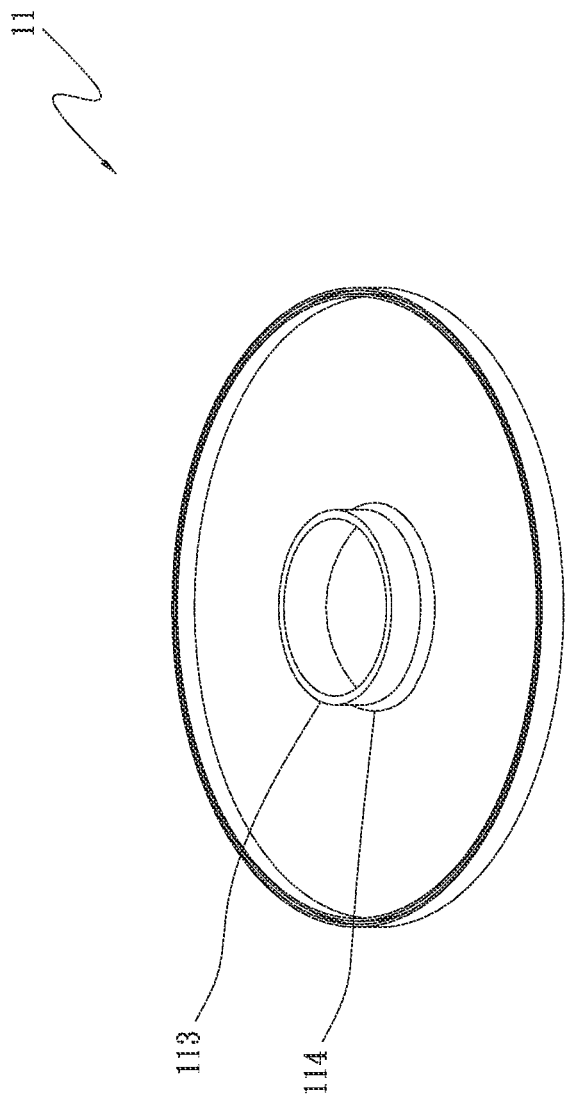
FIG. 4 is a perspective view of a fourth embodiment of the motor waterproof structure of the present invention.

Please now refer to FIGS. 4 and 3B. FIG. 4 is a perspective view of a fourth embodiment of the motor waterproof structure of the present invention. The fourth embodiment is mainly different from the third embodiment in that the assembling section 113 is further formed with a locating section 114. The circuit board 12 is located on the locating section 114. When the circuit board 12 is fitted on the assembling section 113, the locating section 114 prevents the circuit board 12 from slipping to the bottom of the receiving space 111. Accordingly, the circuit board 12 is kept fixed on the open side 112. In the case that the cover body 13 is an insulation cement body, the amount of the filled insulation cement body can be reduced to lower the cost.

In conclusion, in comparison with the conventional structure, the present invention has the following advantages:
1. The circuit board is effectively protected.
2. The circuit board is protected from being short-circuited and burned out in a humid environment.
3. The failure analysis and reworking can be easily performed.

The present invention has been described with the above embodiments thereof and it is understood that many changes and modifications in the above embodiments can be carried out without departing from the scope and the spirit of the invention that is intended to be limited only by the appended claims.

What is claimed is:
1. A motor waterproof structure comprising:
a stator assembly having multiple silicon steel sheets and multiple windings;
a casing having a recessed receiving space formed with an open side and a closed side, a circuit board is disposed in the receiving space and rests on the closed side of the casing and is electrically connected with the windings;
a cover body disposed on the open side of the receiving space to completely cover and, with the casing, sealably enclose the circuit board, but excluding the stator assembly; and
wherein the casing, circuit board and cover body are disc-shaped.
2. The motor waterproof structure as claimed in claim 1, wherein the casing is made of polymer material or metal material.
3. The motor waterproof structure as claimed in claim 1, wherein the cover body is an insulation cement body or a sealing cover.
4. The motor waterproof structure as claimed in claim 3, wherein the cover body is a sealing cover and is connected with the casing by means of engagement.
5. The motor waterproof structure as claimed in claim 3, wherein the cover body is an insulation cement body and is connected with the casing by means of bonding.
6. The motor waterproof structure as claimed in claim 1, wherein the casing is formed with an assembling section in the receiving space, the circuit board being fitted on the assembling section.
7. The motor waterproof structure as claimed in claim 6, wherein the assembling section is further formed with a locating section, the circuit board being located on the locating section.
8. The motor waterproof structure as claimed in claim 1, further comprising a fan impeller having a hub and multiple blades annularly arranged around the huh.

* * * * *